(No Model.)

J. MARTIN.
DRAFT EQUALIZER.

No. 375,082. Patented Dec. 20, 1887.

WITNESSES
Edwin T. Yewell.
J. J. F. Johnson

INVENTOR
Joseph Martin
by
T. S. Alexander
Attorney

UNITED STATES PATENT OFFICE.

JOSEPH MARTIN, OF HARTWICK, IOWA.

DRAFT-EQUALIZER.

SPECIFICATION forming part of Letters Patent No. 375,082, dated December 20, 1887.

Application filed October 4, 1887. Serial No. 251,410. (No model.)

*To all whom it may concern:*

Be it known that I, JOSEPH MARTIN, of Hartwick, in the county of Poweshiek and State of Iowa, have invented certain new and useful Improvements in Draft-Equalizers; and I do hereby declare that the following is a full, clear, and exact description thereof, reference being had to the accompanying drawings, and to the letters of reference marked thereon, which form part of this specification, in which—

Figure 1:
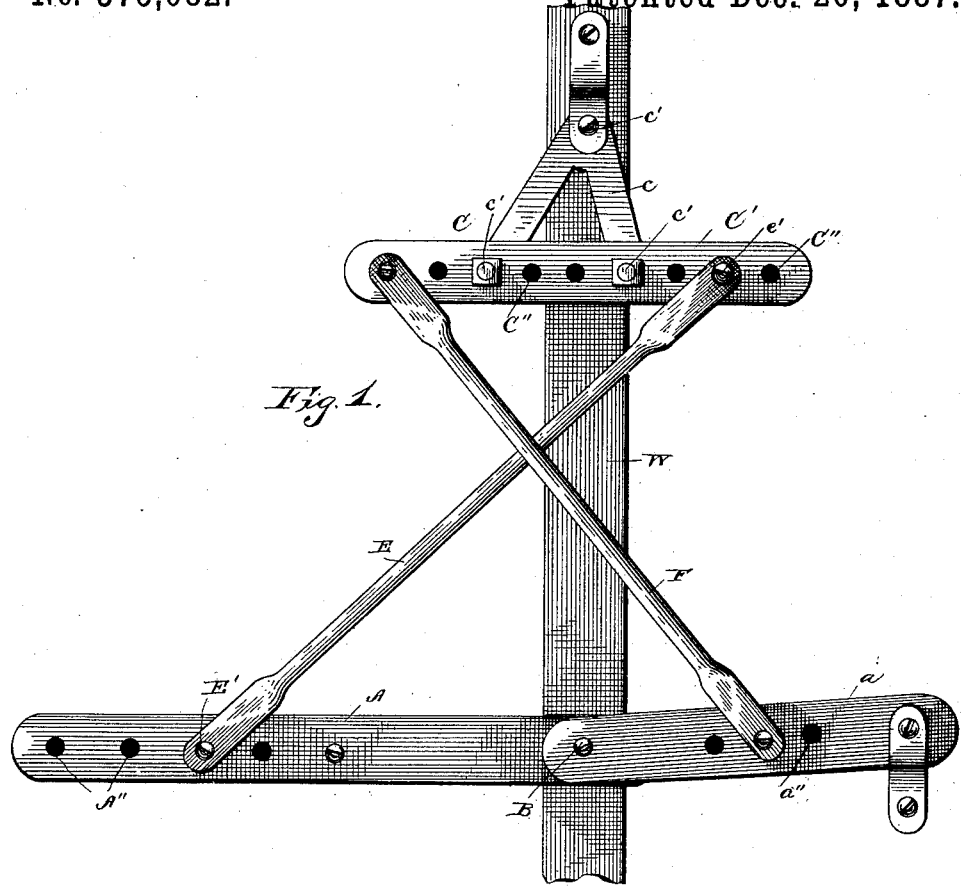
Figure 2:
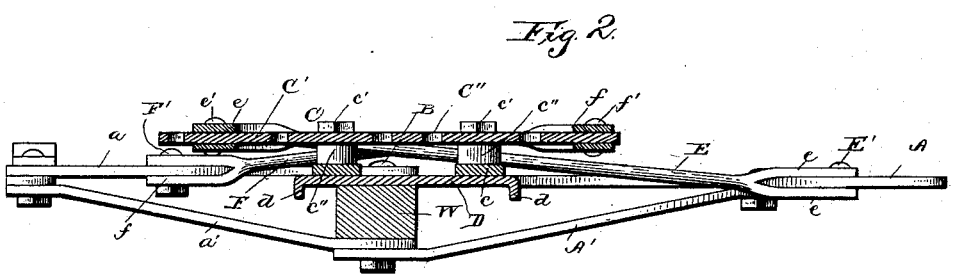

Figure 1 is a plan view of my improved draft-equalizer. Fig. 2 is a vertical sectional view through part of the same on line $x\,x$, Fig. 1.

This invention relates to improvements in draft-equalizers for teams in which unequal numbers of animals are employed, or in which the animals on opposite sides of the tongue are of unequal strength, its object being to even or proportionate the strain or draft upon each and all the animals in harness.

To this end the invention consists in a novel combination, construction, and arrangement of independent draft-levers, an equalizing device, and connecting-rods which can be adjusted to suit the varying number of animals employed in a team, and which, when so adjusted, will automatically distribute the draft according to the ability of the several animals in the team, all of which will be fully understood from the following description, and particularly pointed out in the appended claims.

Referring to the drawings by letters, W designates the tongue. A $a$ designate the draft-levers, which are pivoted independently of each other upon tongue W by means of a bolt, B. The lever A is longer than lever $a$, as shown.

A′ designates a bracing-bar below lever A, the outer end of which is bolted or otherwise secured to said lever near the center thereof, and its inner end is pivoted upon the bolt B below tongue W. $a'$ designates a similar bracing-bar, the outer end of which is secured to the outer end of lever $a$ and the inner end pivoted on bolt B below tongue W, as shown. These bracing-arms A′ $a'$ aid in keeping levers A $a$ in horizontal position and relieve strain on their pivoted ends.

The lever A is provided in its outer end with a series of perforations or holes, A″, and the lever $a$ is also provided with a series of perforations, $a''$, hereinafter referred to.

At a proper distance in rear of the draft-levers is pivoted on tongue W the equalizing device C, which is constructed as follows:

$c$ designates a V-shaped plate, pivoted at its apex upon tongue W by a bolt, $c'$, with its arms diverging toward levers A $a$.

C′ designates a bar secured to the widest end of the plate by means of bolts $c'\,c'$, but having interposed between it and said plate washers $c''\,c''$, by which it is kept above said plate, as shown. The bar C′ is provided with a number of equidistant perforations or holes, C″, by which the position of said bar upon plate $c$ can be varied and for the attachment of connecting-rods, hereinafter referred to.

D designates a bar secured to the under surface of plate $c$ in line with bar C′, but of less length than said bar and not adjustable. The bolts $c$ may pass through the bar D to retain it in position, if desired, or it can be otherwise secured to plate $c$. The ends of bar D project slightly beyond the lateral edges of plate $c$, and are bent downward, as shown at $d\,d$, forming stop-lugs by which the pivotal lateral play of plate $c$, with its attached parts, is controlled, the said stops $d\,d$ being adapted to engage against the opposite sides of tongue W as plate $c$ is shifted.

E designates a rod having flattened and bifurcated ends $e\,e$, which extends between the lever A and the end of bar C′ on the opposite side of tongue W. The rod is adjustably attached to said lever and bar by means of its bifurcated heads $e\,e$, which embrace the lever and bar, respectively, and bolts and nuts E′ $e'$, which bolts pass through suitable perforations in heads $e\,e$ and the perforations A″ C″ in the lever and bar, respectively.

F designates a rod similar to rod E, but shorter than the latter, having bifurcated heads $f$ and bolts and nuts F′ $f'$, respectively, by which its opposite ends are adjustably engaged with the lever $a$ and the opposite end of bar C′ through the perforations $a''$ and C″. Thus arranged, as shown in the drawings, it will be seen that the rods E and F intersect each other, but are properly bent to prevent their binding on each other at their point of crossing.

In practice, where three animals are employed, a singletree is attached to lever $a$ and a doubletree to lever A, in front thereof, as will be readily understood. These trees, however, are not shown in the drawings. The draft-strain from the team is transferred through rods E F from levers A a to the pivot of the equalizer C. It will be obvious, by reference to the drawings, that the relative points of attachment of rods E and F to their respective levers and opposite ends of bar C' can be so adjusted as to equalize the leverage exerted by the animals attached to levers A a on the bar C', and consequently proportionate the strain on the animals without any lateral strain on tongue W.

By reason of the series of perforations in the levers A a and bar C', great nicety of adjustment for varying teams can be obtained, so that the levers A a can always extend parallel with each other, although bar C stands at an angle thereto.

The stop-bar D prevents the equalizer C from turning so far upon its pivot as to shift either rod E or F past the center or to the opposite side of the tongue.

I am aware that equalizing devices have been employed in which unequal draft-levers, an equalizing device upon the tongue, and intersecting connecting-rods between the equalizer and draft-levers have been used, and therefore do not claim such an arrangement, broadly; but What I do claim, and desire to secure by Letters Patent, is—

1. In a draft-equalizer, the combination, with the front unequal independent draft-levers pivoted upon the tongue, of an equalizing device composed of a V-shaped plate pivoted at its apex upon the tongue and having adjustably secured thereto a bar, C', provided with a series of perforations, and the intersecting rods E and F, adjustably connected with the draft-levers and the opposite ends of bar C', all substantially as specified.

2. The combination of the unequal draft-levers A a, having series of perforations A" a", respectively, and pivoted upon the tongue at their inner ends, with the equalizing device C, composed of the pivoted V-shaped plate c, and the cross-bars C', adjustably secured at the front ends to said plate, having the perforations C", and the intersecting rods E and F, adjustably connected to the opposite ends of bar C' in perforations C" and to the opposite levers A a in the perforations thereof, all substantially as set forth.

3. The draft-equalizer herein described, composed of the front unequal levers, A a, perforated as described, and pivoted upon the tongue, and the bracing-bars A' a' therefor, in combination with the equalizer C, comprising a V shaped plate, c, pivoted upon the tongue in rear of levers A a, the bar C', perforated as described, adjustably secured to the front ends of plate c, and the stop-bar D below the same, and the intersecting rods E F, having bifurcated ends and respectively connecting the levers A a with the opposite ends of bar C', all constructed and arranged to operate substantially as described.

In testimony that I claim the foregoing as my own I affix my signature in presence of two witnesses.

JOSEPH MARTIN.

Witnesses:
CHARLES McBRIDE,
ALBERT J. GASCHE.